(12) United States Patent
Leach

(10) Patent No.: US 9,756,843 B2
(45) Date of Patent: Sep. 12, 2017

(54) WEED TERMINATING DEVICE USING SUPERHEATED WATER AND SPRING LOADED DISCHARGE VALVE

(71) Applicant: John Leach, Winnipeg (CA)

(72) Inventor: John Leach, Winnipeg (CA)

( * ) Notice: Subject to any disclaimer, the term of this patent is extended or adjusted under 35 U.S.C. 154(b) by 175 days.

(21) Appl. No.: 14/925,280

(22) Filed: Oct. 28, 2015

(65) Prior Publication Data

US 2016/0120165 A1 May 5, 2016

Related U.S. Application Data

(60) Provisional application No. 62/074,333, filed on Nov. 3, 2014.

(51) Int. Cl.
*A01M 3/00* (2006.01)
*F22B 1/28* (2006.01)
*A01M 21/04* (2006.01)

(52) U.S. Cl.
CPC ............ *A01M 3/007* (2013.01); *A01M 21/04* (2013.01); *F22B 1/284* (2013.01)

(58) Field of Classification Search
CPC combination set(s) only.
See application file for complete search history.

(56) References Cited

U.S. PATENT DOCUMENTS

| | | | |
|---|---|---|---|
| 2,012,521 A * | 8/1935 | Rognerud | A01M 15/00 126/271.1 |
| 2,881,755 A * | 4/1959 | Diehl | A61H 33/063 126/271.1 |
| 3,719,795 A * | 3/1973 | Bolomier | A61H 33/12 392/395 |
| 3,910,498 A * | 10/1975 | Harrison | B60S 3/00 222/146.5 |
| 4,756,118 A * | 7/1988 | Evans, II | A01M 1/2094 43/124 |
| 5,385,106 A * | 1/1995 | Langshaw | A01G 11/00 111/118 |

(Continued)

FOREIGN PATENT DOCUMENTS

| | | | | |
|---|---|---|---|---|
| CA | 2734457 A1 * | 11/2011 | | A01M 21/04 |
| CA | 2910698 A1 * | 5/2016 | | A01M 3/007 |

(Continued)

*Primary Examiner* — Christopher P Ellis
(74) *Attorney, Agent, or Firm* — Kyle R Satterthwaite; Ryan W Dupuis; Ade & Company Inc.

(57) ABSTRACT

A weed or insect terminating device features a container having a valve port, a heating element, a valve core, and a biasing mechanism forcing the valve core into an extended position. An axial passage in the valve core extends through only a distal end of the valve core. A lateral passage intersects the axial passage and opens radially from the valve core. A proximal seal is provided between the valve core and valve port at a location between a proximal end of the valve core and the opening of the lateral passage. The proximal seal withdraws from sealed contact with the port in a retracted state of the valve core, while a distal seal remains intact. Heated water from the container can be dispensed through the valve port only via the lateral and axial passages of the valve core, and only when made accessible by retraction of the valve core.

20 Claims, 3 Drawing Sheets

(56) References Cited

U.S. PATENT DOCUMENTS

| | | | |
|---|---|---|---|
| 5,870,852 A * | 2/1999 | Stanley | A01M 19/00 111/7.1 |
| 5,927,601 A | 7/1999 | Newson et al. | |
| 5,946,851 A | 9/1999 | Adey et al. | |
| 6,321,037 B1 * | 11/2001 | Reid | A01M 21/04 392/466 |
| 6,505,437 B1 * | 1/2003 | Johnstone | A01M 21/04 47/1.44 |
| 7,100,540 B2 | 9/2006 | Vaughan | |
| 2005/0279293 A1 * | 12/2005 | Vaughan | A01M 15/00 122/36 |
| 2006/0065266 A1 * | 3/2006 | Saksena | A21B 3/04 126/369 |
| 2007/0056209 A1 * | 3/2007 | Schuster | A01M 3/007 43/132.1 |
| 2007/0176316 A1 | 8/2007 | Musten et al. | |
| 2010/0267558 A1 * | 10/2010 | Howerton | A01G 7/02 504/121 |
| 2011/0253803 A1 * | 10/2011 | Kennedy | A01M 21/04 239/71 |
| 2011/0283609 A1 | 11/2011 | Leach | |
| 2013/0000193 A1 * | 1/2013 | Ballu | A01M 21/04 47/58.1 R |

FOREIGN PATENT DOCUMENTS

| | | |
|---|---|---|
| EP | 1695620 | 8/2006 |
| JP | 7-163285 | 6/1995 |
| JP | 2002-065138 | 3/2002 |

\* cited by examiner

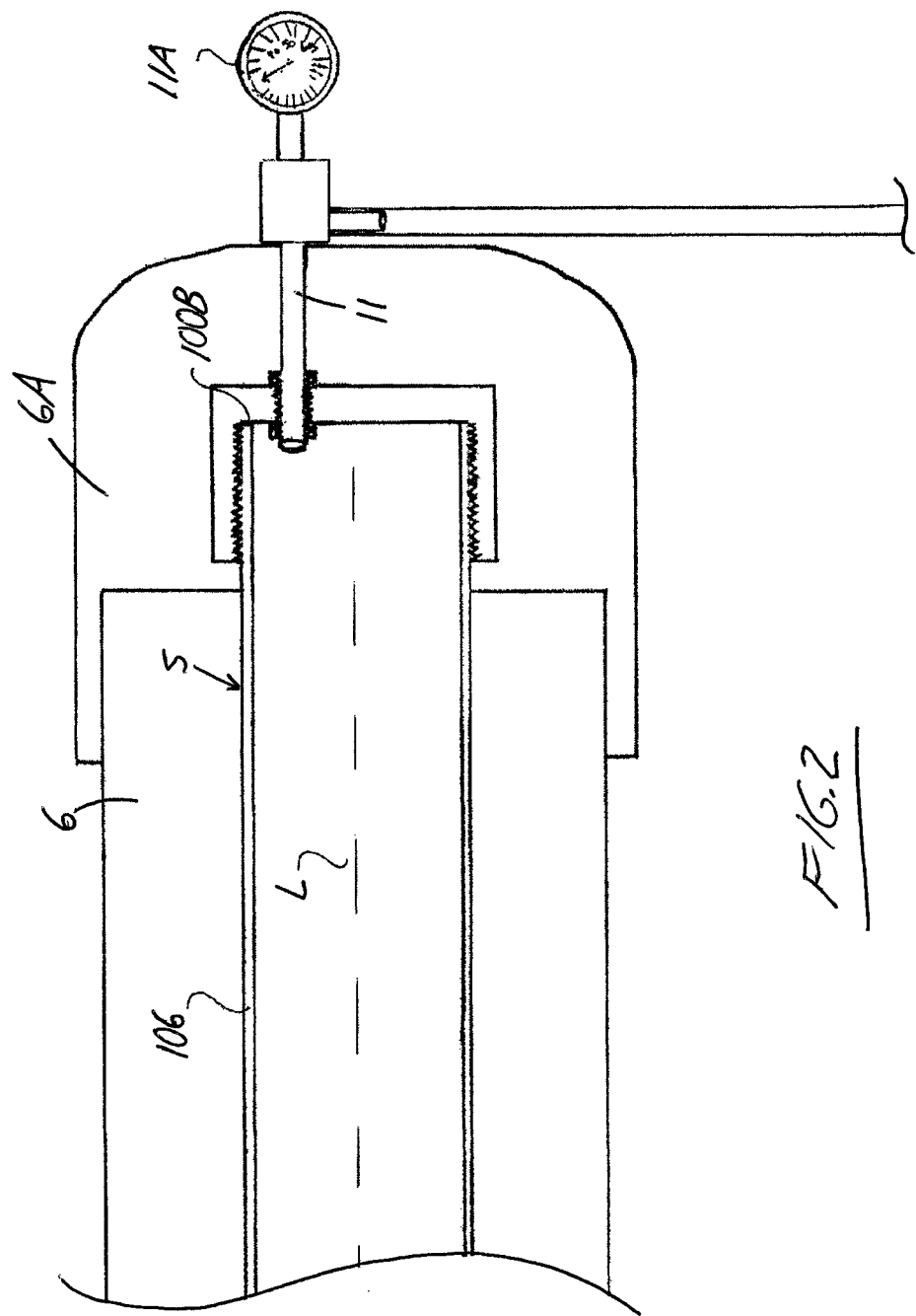

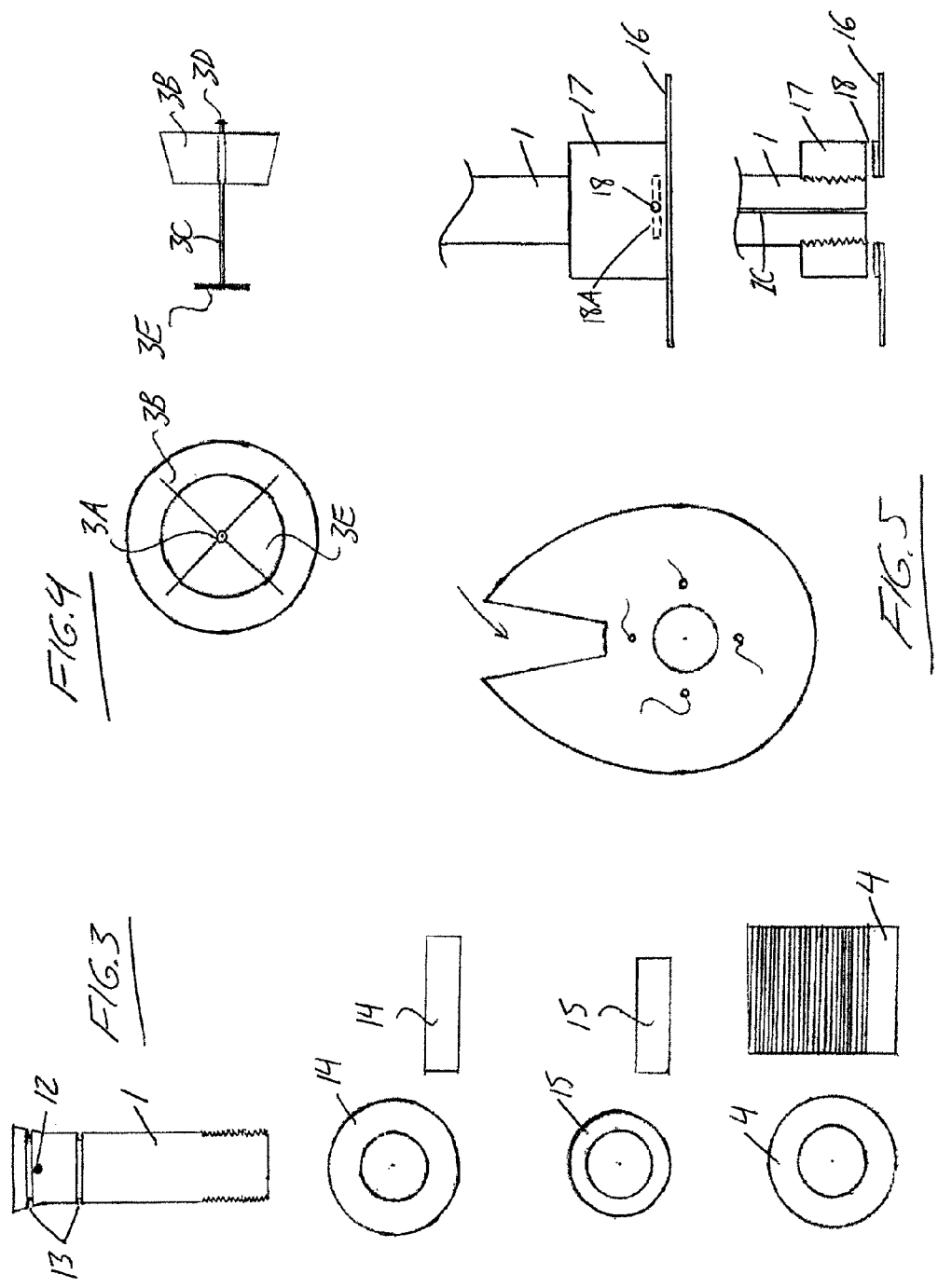

WEED TERMINATING DEVICE USING SUPERHEATED WATER AND SPRING LOADED DISCHARGE VALVE

CROSS REFERENCE TO RELATED APPLICATIONS

This application claims benefit under 35 U.S.C. 119(e) of Provisional Application Ser. No. 62/074,333, filed Nov. 3, 2014, the entirety of which is incorporated herein by reference.

FIELD OF THE INVENTION

The present invention relates generally to killing unwanted vegetation, and more particularly to apparatus and methods for weed control using targeted application of superheated water to individual weeds to terminate same without damage to surrounding desirable vegetation.

BACKGROUND OF THE INVENTION

With rising concerns over environmental issues, current trends are leaning toward reduced use of chemical herbicides in weed control. For some time it has been known in the prior art to use steam or heated water to try and kill weeds, and a number of devices or machines have been developed to make use of this principle. U.S. Pat. Nos. 5,385,106, 5,927,601, 5,946,851 and 7,100,540, U.S. Patent Application Publication Number 2007/0176316, European Patent Application Number 1695620 and Japanese Patent Document Numbers 7-163285 and 2002-065138 teach examples of such water or steam-based prior art solutions.

However, some of these prior art solutions include use of large equipment and vehicle-based systems that do not lend well to small scale use by individual home owners for personal lawn maintenance, configurations that apply steam or heated water in an above ground context that may inadvertently damage surrounding vegetation or may not adequately treat the subsurface element of the weeds to prevent the unwanted vegetation from re-emerging, and configurations that, while small enough for portable or personal use, require on board electrical sources or combustible fuel to heat and convey the water. Combustion-based tools can be expensive to operate, emit harmful exhaust fumes and present risk of explosion or fire. While battery technology has dramatically improved in recent years, some consumers are hesitant to purchase battery operated yard care tools in view of the potential loss of ability to maintain the battery's original level of charge after repeated uses, leading to reduced performance or need for replacement battery packs.

In U.S. Patent Application Publication 2011/0283609, Applicant previously proposed a solution involving use of compressed air for pressurized injection of heated water into the ground directly to the endosperm of the unwanted vegetation. However, Applicant found that due to variations in soil conditions, pressurized injection of the water beneath the surface can lead to unpredictable results in the size of the 'kill area'.

As a result, Applicant has moved away from below-ground injection, and has now developed a new apparatus for surface-level application of superheated water in a targeted manner effective for spot treatment of weeds without undesired harm to surrounding grass or other vegetation that the user wishes to leave intact.

SUMMARY OF THE INVENTION

According to one aspect of the invention there is provided a weed or insect terminating device comprising:

a container having opposing first and second ends spaced apart on a longitudinal axis that defines a longitudinal direction of the container, a peripheral wall closing around said longitudinal axis to enclose and interior space of the container between the first and second ends thereof, a valve port opening into the interior space of the container at the first end thereof, and an openable and closeable fill opening for introduction of water into the interior space of the container;

a heating element disposed within the interior space of the container between the first and second ends thereof;

a valve core slidably disposed in the valve port at the first end of the container and displaceable back and forth in the longitudinal direction between a retracted state and an extended state in, the valve core reaching further outward from the first end of the container in the extended state than in the retracted state;

a biasing mechanism acting on the valve core in the longitudinal direction to bias the valve core into the extended position;

an axial passage in the valve core that extends through a distal end of the valve core that resides outside the container beyond the first end thereof in at least the extended position, the axial passage terminating short of a proximal end of the valve core that resides opposite the distal end thereof;

a lateral passage in the valve core that intersects the axial passage and opens radially from the valve core at a point on the valve core that resides inside the container in the retracted position;

a proximal seal spanning circumferentially around the valve core at a location between the proximal end of the valve core and the point at which the lateral passage opens radially therefrom, the proximal seal being arranged to seal against a boundary wall of the valve port in the extended position and withdraw from sealed contact with the boundary wall of the valve port in the retracted position, thereby allowing access to the lateral passage of the valve core by water in the container only in the retracted state of the valve core; and a distal seal spanning circumferentially around the valve core in sealed contact with the boundary wall of the valve port at a location between the distal end of the valve core and the point at which the lateral passage opens radially therefrom, whereby water from the container can be dispensed through the valve port only via the lateral and axial passages of the valve core, when made accessible by retraction of the valve core.

Preferably a final discharge opening from which water exits the device through the axial passage of the valve core is defined at a non-pointed terminus of the device.

Preferably the non-pointed terminus of the device is flat.

The final discharge opening may be an open end of the axial passage at the distal end of the valve core, which defines the non-pointed terminus of the device.

Preferably the boundary wall of the valve port comprises a tapered portion that grows wider toward the second end of the container, and a wider end of said tapered portion exceeds the proximal seal of the valve core in diameter.

Preferably the valve core comprises a tapered region adjacent the proximal end thereof with an angle and direction of taper matching the tapered portion of the boundary wall of the valve port.

Preferably the boundary wall of the valve port is defined by a threaded insert threadingly mated to the container at the first end thereof.

Preferably the threaded insert comprises a self-lubricating plastic.

Preferably the valve core comprises a high temperature plastic.

Preferably the valve core comprises polyphenylsulfone.

Preferably the container is externally covered with heat insulation material.

Preferably the heat insulation material comprises recycled denim.

Preferably the biasing mechanism comprises a support disposed inside the container and having radial fins attached to the peripheral wall of the container at a distance spaced from the valve port in the longitudinal direction, with openings left between said radial fins to allow passage of water past the support to the valve port, and a coil spring disposed between the support and the valve core to bias the valve core into the extended position.

Preferably the biasing mechanism further comprises a shaft extending from the support toward the valve core, the spring being coiled around the shaft between the support and the proximal end of the valve core.

Preferably the shaft passes through a central hub of the support from which the radial fins extend, the shaft has an end plate radiating outward from one end thereof on the same side of the support as the valve core and a stop fixed on the shaft on an opposing side of the support, and the spring is contained between the support and the end plate of the shaft in order to bias the end plate toward the valve port while the stop limits the allowable travel distance of the end plate toward the valve port.

There may be provided a tip attachment selectively attachable to and detachable from the valve core, the tip attachment increasing a footprint of the device at the distal end of the valve core to prevent ground penetration by the valve core when pressed against a ground surface or object to force the valve core into the retracted position.

Preferably the tip attachment comprises an internally threaded collar for engagement onto the valve core via external threading at the distal end thereof, and in one embodiment mating threads on the valve core and the collar are arranged to bottom out in a position in which an end portion of the collar extends past the distal end of the valve core, whereby the distal end of the valve core is spaced from the ground surface when the tip attachment is placed against said ground surface.

In one embodiment the collar comprises at least one radial opening extending therethrough at the end portion of the collar that extends past the distal end of the valve core.

In one embodiment, the tip attachment further comprises a foot plate radiating outwardly from the end portion of the collar to present a greater area of ground contact than provided by said collar.

Preferably the heating element is arranged to heat the water into a superheated state.

BRIEF DESCRIPTION OF THE DRAWINGS

Preferred embodiments of the invention will now be described in conjunction with the accompanying drawings in which:

FIG. 2 is a partial cross-sectional view of the device of FIG. 1, specifically showing an opposing upper end thereof at which the container is fillable by an openable/closeable filling cap, and where a safety relief valve is installed to relieve excess pressure from the container.

FIG. 3 shows an elevational view of a valve core of the device, together with elevational and plan views of cooperable components, including optional ring tip attachments and a surrounding valve stem insert that threads into an open end of the container to define the valve port in which the valve core is slidably disposed.

FIG. 4 illustrates elevational and plan views of select components of a spring-based biasing mechanism that normally holds the valve core in its closed condition.

FIG. 5 illustrates elevation, bottom plan and cross-sectional views of another optional tip attachment, which features a radially vented collar and an enlarged footplate.

DETAILED DESCRIPTION

Figure 1:
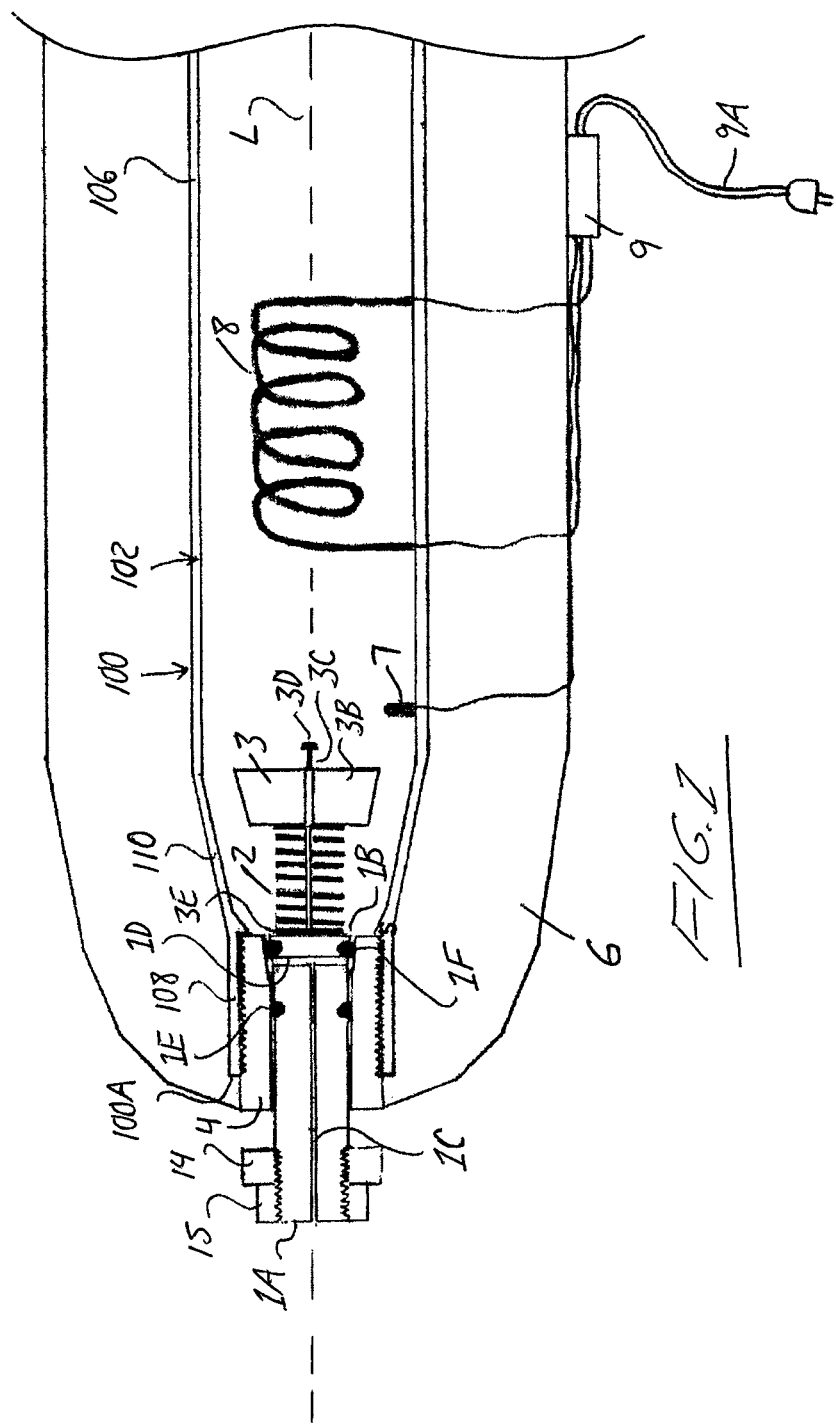
FIG. 1 is a partial cross-sectional view of a wand-shaped, water-based weed killing device of the present invention, specifically showing a lower end of the device which features a pressure activated discharge valve for releasing a pressurized charge of superheated water from an internal water-heating container of the device simply by forcing a lower tip of the device down against the ground over the targeted weed.

The appended drawings illustrate a weed killing apparatus or device that uses heated (preferably superheated) water to kill weeds by effectively "cooking" or "poaching" them, and therefore is referred to in some passages herein as a 'Weed Poacher'.

The device features an elongated container or vessel 100 to which water is added for subsequent heating within the container or vessel to a suitable temperature that will kill a weed when the water is discharged from the container in the manner described herein below. The container 100 has a first open end 100A and a second open end 100B situated opposite one another and spaced apart along a central longitudinal axis L of the container. A peripheral or circumferential wall 102 of the container closes concentrically around the longitudinal axis L, and is divided into a cylindrical main section 106 spanning a majority of the container's axial length from the second end 100B toward the first end 100A, a cylindrical end section 108 situated at the first end 100A of the container and being smaller in diameter than the cylindrical main section 106, and a frusto-conically tapered intermediate section 110 joining the two cylindrical sections 106, 108 together near the first end 100A of the container.

When the device is in use, it is oriented upright so that the first end 100A defines a lower end of the container from which water is discharged, and the second end 100b defines an upper end of the container near which the device is carried in one or both hands of a user. In the drawings, the device is illustrated horizontally, with the left end of FIG. 1 denoting the lower end of the device and the right end of FIG. 2 denoting the upper end of the device. Accordingly, the terms of "left" and "right" in the following description can be respectively equated to "lower" and "upper", or "bottom" and "top", in relation to the operational position of the device.

Referring to FIG. 1, it shows a cross section (drawn to scale) of the lower half of the Weed Poacher. Starting at the left is the valve core 1, which in one preferred embodiment is made of Tecason™ P polyphenylsulfone, a thermal plastic with low heat conductivity and high thermal and mechanical capacity. The valve core 1 is disposed within the cylindrical end section 108 of the container 100, and is slidable back and forth along the longitudinal axis L of the container 100.

A distal end 1A of the valve core 1 reaches outside the container 100 beyond the lower end 100A thereof to define a lower or left end of the valve core 1. From this left end, the valve core 1 is externally threaded over a partial fraction of the valve core's axial length (for example, being threaded over a ½-inch of its axial length) to allow different attachments or "tips" to be simply screwed onto the valve core.

In FIG. 1, two internally threaded ring-shaped attachments 14, 15 are shown as being threaded onto the external distal end 1A of the valve core 1 to provide resistance to ground penetration by the valve core when the distal end 1A is forced against the ground over a weed in order to release superheated water from the container 100 onto the weed in the manner described herein further below. The rings 14, 15 also provided added thermal insulation around the valve core 1 and a mechanical stop to limit sliding of the valve core into the container, thereby prevent the valve core from placing strain on a spring support structure 3 when the valve core 1 is pressed onto a weed.

The valve core 1 is spring-biased into an extended position in which the distal end 1A thereof reaches further outward from the first end 100A of the container 100 than in a retracted position. To accomplish this, the spring support 3 features a central hub 3A from which a plurality of radial fins or vanes 3B radiate outwardly for fixed attachment, for example by welding, to the frustonically tapered section 108 of the peripheral wall 102 of the container at an axial distance from the proximal end 1B of the valve core 1 that resides inside the container. A shaft 3C slidably passes through the hub 3A of the spring support 3 via an axial through-bore of the hub 3A. An enlarged head 3D on one end of the shaft 3C resides on the side of the spring support 3 opposite the valve core 1, and for example may be defined by a lock nut threaded onto an externally threaded end of the shaft. At the opposing end of the shaft 3C on the same side of the support 3 as the valve core 1, the shaft carries a circular end plate 3E that radiates outwardly from the shaft with a greater diameter than both the shaft 3C and the head 3D.

A compression spring 2 has an inner coil diameter greater than the outer diameter of the shaft 3C, and an outer radius that is less than the radial measure of the radials fins 3B of the support 3, and less than the radius of the end plate 3E. The spring 2 coils concentrically around the shaft 3C, and is contained between the end plate 3E and the radial fins 3B of the support 3. The spring 2 forces the end plate 3E of the shaft 3 against the proximal end 1B of the valve core 1 in order to constantly bias the valve core into the extended position. In one embodiment, the spring has a spring force of about eight pounds in order to confidently re-seat the valve core without stuttering, though other spring force vales may alternatively be employed.

At the center of the valve core is a hole that defines an axial passage 1C extending partially through the valve core from the distal end 1A thereof. In one particular embodiment, the axial hole 1C is 1/32-inch in diameter. This axial passage 1C intersects a lateral passage 1D, which for example defined by a 1/16-inch hole passing diametrically through the core 1 near the proximal end 1B thereof. There is one O-ring 1 E to the left of the lateral passage 1D, and another O-ring 1F just to the right of the lateral passage 1D in order to provide a complete seal around radial openings of the lateral passage 1D at the periphery of the valve core 1 when the valve core is seated in the extended position by the biasing mechanism that is defined by the spring support 3 and associated shaft 3 and spring 2 to provide the closing pressure that re-seats the valve core.

The valve core 1 is slidably disposed within an externally threaded valve stem or insert 4 that is engaged within the cylindrical end section 108 of the container 100 by way of internal threading thereon. In one preferred embodiment, the valve stem or insert 4 is made of Nyloil™, a self-lubricating plastic to allow the free sliding of the valve core. With the valve core 1 slidably disposed in an axial through-bore of the valve stem or insert 4, the valve stem or insert thus defines a valve port at the first open end 100A of the container 100 by which opening and closing of this end of the container can be controlled by movement of the valve core within the valve stem or insert 4. The inner surface of the valve stem or insert 4 thus defines a boundary wall of the valve port, and both o-rings 1E, 1F are sealed with this boundary wall of the valve port when the valve core is in the extended position.

Turning briefly to FIG. 3, the valve is shown in a dissembled state, with the isolated valve core at the top of the figure, the optional attachment rings 14, 15 beneath it, and the valve stem insert 4 at the bottom of the figure. An upper portion of the valve core 1 is frustoconically tapered from the proximal end 1B thereof to a point just axially past the radial openings 12 of the lateral passage 1D. One of two o-ring grooves 13 recessed in the periphery of the valve core resides at the tapered upper portion at a position axially above the radial openings 12 of the lateral passage 1D. The other one of the o-ring grooves 13 resides below the radial openings 12 of the lateral passage 1D at the untapered remainder of the valve core. Turning back to FIG. 1, the internal bore of the valve stem insert 4 is tapered at the inner end of the valve stem insert 4 that resides inside the container in abutment with an internal shoulder of the container where the cylindrical end section 108 and tapered section 110 meet. The direction and angle of taper at the inner end of the valve stem bore match those of the tapered upper portion of the valve core 1. In one embodiment, the proximal end 1B of the valve core 1 is 1/16-inch larger in diameter than the cylindrical majority of the core that extends from the tapered top end portion to the distal lower end 1A.

When the valve core is in the extended position (as shown in the drawings), the lower O-ring 1E forms a distal seal between the cylindrical portions of the valve core 1 and the valve stem 4 on the same side of the lateral passage 1D as the distal end 1A of the valve core, and the upper O-ring 1F forms a proximal seal between the tapered portions of the valve core 1 and the valve stem 4 at a location adjacent the proximal end 1B of the valve core. However, forcing of the distal end 1A of the valve core 1 toward the container 100, for example by pressing the distal end 1A of the valve core down against the ground, pushes the valve core 1 further into the container against the resisting force of the spring, which denotes a retracted position of the valve core. Due to the tapered shape of the inner end of the valve stem insert 4, this movement into the retracted position removes the proximal/upper O-ring 1F from contact with the valve stem insert 4, thereby opening the radial openings 12 of the lateral passage 1D of the valve core 1 into fluid communication with the interior space of the container to allow fluid from the container to pass through the valve core via the lateral and axial passages. On the other hand, when the valve core is in the extended position, the lateral passage (and the axial passage intersecting therewith) are sealed off in the valve port, and thus closed off from the remainder of the container's interior space. Each of one or more tip attachments 14, 15 on the distal end of the valve core has an outer diameter that exceeds the inner diameter of the valve stem 4, whereby a fully retracted state of the valve core is denoted by abutment of the ring attachment against the end of the valve stem insert 4.

In one embodiment, the container or vessel 100 is formed from a 1½-inch, thin-walled stainless steel pipe 5 that is narrowed to 15/16-inch at the cylindrical end section 108, and is internally threaded at this end to accept the valve stem insert 4. With reference to FIG. 2, the cylindrical main section 106 of the container 100 is externally threaded at the open end 100B thereof, and an internally threaded cap 10 is matable with the threaded end 100B of the container 100 to selectively open and close same to allow filling of water into the interior space of the container. External insulation covers substantially the entire container 100 from the first end 100A to near the second end 100B thereof. In one embodiment, the external insulation is provided in the form of multiple layers (e.g. twelve layers) of cotton denim 6 wrapped around the periphery of the container. Preferably the external insulation is selected to keep with sufficient insulation value to keep the heat loss down to 1° C. every two minutes.

A temperature sensor 7 is mounted inside the container 100, as is an electrical heating element 8. A thermostat 9 is mounted outside of the container, for example externally of the insulation 6, and is wired to the temperatures sensor 7 and the heating coil 8 in order to regulate the electrical current to the heating element to maintain the temperature thereof at a predetermined value, which in one embodiment is 130° C. In one embodiment, the thermostat is configured temperature to continue maintain this predetermined temperature for a few minutes after reaching it, to allow all parts and materials inside the insulation 6 to reach or closely approach 130° C. for maximum energy capacity.

With continued reference to FIG. 2, a high pressure relief valve 11 communicates with the interior space of the container and the external environment, for example through a suitable port or opening in the cap 10. The relief valve is set to a predetermined threshold, for example 65 PSI, and will open the tank interior to the external environment if the internal pressure within the container exceeds this threshold. A visually readable pressure gauge 11A may also be included to allow user-reading of the current internal pressure of the container. In one embodiment, the capacity of the tank, container or vessel 100 is one liter, including room for expansion, although other sizes may alternatively be employed. The filler cap 10 is preferably covered with an insulation cap 6A, for example a denim toque that slips over the container cap 10 and onto the wrapped insulation 6 on the container 100, and includes a suitable opening to accommodate venting of the container to the environment via the pressure relief valve 11 if the safety threshold is exceeded.

FIGS. 1 and 3 show the optional ring attachments 14 and 15 that can be screwed onto the lower end of the valve core 1. This tip configuration is for using the weed poacher to treat insects in woodwork, or treat weeds or insects at or adjacent rocky, hard ground or paved areas. The tip attachments increase the diameter at the distal end 1A of the tip relative to the use of the valve core alone without any tip attachments, whereby the increased surface area at the distal end of the valve core distributes force over a greater footprint when this distal end of the valve core is pushed against the ground in order to drive the valve core upward into the retracted open position, in which heated water in the container interior is discharged through the valve core for final exit from the device where the axial passage of the valve core opens through the distal end of the valve core. This increase in footprint area by use of the attachments reduces the likelihood of ground penetration by the valve core during this application process by spreading out the application force over a greater area of interface between the valve core and the ground.

For use on softer ground, a larger tip attachment for weeds and small ant colonies is shown in FIG. 5. This larger tip attachment features flat footplate 16 whose width and length dimensions exceed the outer diameters of both of the smaller ring tip attachments 14, 15. The footplate 16 may be a flexible stainless steel footplate of 1/32-inch thickness, although other materials, thicknesses, and relative flexibility/rigidity may alternatively be employed. The flexibility may contribute to improved conformity between the footplate and the ground to better prevent escape of superheated water from the target area. The foot plate 16 is attached to the bottom of an internally threaded valve core collar 17 that threads onto the externally threaded lower/distal end 1A of the valve core 1. An axial length of the collar 17 exceeds the axial length of the threading on the valve core 1, whereby when the threaded connection bottoms out, a lower end portion of the collar 17 extends axially beyond the distal end 1A of the valve core 1. This way, the foot plate 16 is spaced an axial distance from the distal end 1A of the valve core when the tip attachment is installed, such that the distal end 1A of the valve core is spaced a short distance above ground when the foot plate 16 is placed atop the ground. This way, the footplate 16 keeps the valve core tip from penetrating the ground, which could plug or foul the tip and interfere with an uninterrupted stream of superheated water that is to be discharged from the axial passage of the valve core to cook the weed.

With the valve core (or tip attachment, when included) seated on the ground, the weight of the weed poacher acts in a direction encouraging the valve to open/retract, which counteracts or overcomes the tank pressure that acts on the valve core in the closing/extension direction. In one embodiment, the weed poacher may be approximately ten pounds. In the event that the weight of the device fully cancels out the tank pressure, the spring force determines the amount of user-applied downward force required to open the valve. For example, an eight pound spring force would allow easy opening of the valve with eight pounds of downforce, while still being operable to quickly and reliably return the valve core to its default extended/closed position.

In the event that the foot plate 16 is flexible, once the valve is open, additional downward pressure would bend or flex the foot plate, allowing the tip to move closer to the ground and the superheated water stream penetrate to a greater depth below the surface of the ground. The illustrated foot plate 16 has a cleft, notch or opening 16A to allow improved aiming, and is attached to the valve core collar by way of four countersunk flat head screws 16B. The valve core collar 17, preferably made of Tecason™ P in particular embodiments, is simply screwed onto the valve core 1. In addition to making the attachment to the valve core, the collar 17 also contains the heat and pressure where the water exits the distal end of the valve core, which helps keep the kill zone focused to a relatively small area, which may for example be smaller than a dime in some embodiments.

There are four radial holes 18 in the valve core collar 17 that intersect the threaded internal bore of the collar 17 to allow pressure to safely escape and not impede the flow rate at the tip. In one embodiment, the radial holes 18 are 1/16-inch in diameter. Any steam or hot water droplets that escape from these radial holes 18 where they open up at the periphery of the collar 17 would fall onto the foot plate 16 and cool harmlessly before running off to the ground below the foot plate 16. These radial relief holes 18 are preferably positioned so as to be centered between the foot plate mounting screws 16B for maximum mechanical integrity and strength of the valve core collar 17. These holes could be made into narrow elongated slits to increase the opening without compromising the mechanical integrity of the collar and footplate assembly. For example, in one embodiment, each hole is an elongated slot that measures $\frac{1}{16}$-inch in height (in the axial direction of the collar) and $\frac{5}{16}$-inch long (in the circumferential direction of the collar). This option of slot-shaped holes or openings in shown in broken lines in FIG. 5 at 18A. The larger slot-shaped openings may help reduce jetting of hot water or steam outward from the holes.

The distal end of the valve core is flat, as is the annular end face of the ring attachment 15 that lies coplanar with the valve core in FIG. 1. Accordingly, whether the valve core forms the ground-contacting terminus of the device alone, or in combination with a ring attachment, or whether the collar and plate attachment of FIG. 5 is used to instead define the ground-contacting terminus of the device at the underside of the flat plate 16, the ground-contact point is always a non-pointed feature that doesn't penetrate the ground, and thus applies the water at the surface so as to accurately treat the target weed with a minimal kill zone in the soil.

Having described the structure of the device, attention is now turned to its method of operation.

First, a user peel backs the insulation toque 6A from the filling cap 10, and screws the threaded cap 10 off of the second end 100B of the container 100. With the Weed Poacher oriented upright, the user then fills the Weed Poacher with water, for example up to 2½ inches below the rim, of the open upper end 100B, thus leaving this open room at the top of the container to allow for expansion during heating. The user replaces and tightens the filler cap 10, and replaces the denim cap/toque 6A of over the threaded filler cap 10. The user plugs an electrical cord 9A of the heating device 7, 8, 9 into a mains power outlet, at which point the heater coil 8 will start to warm up. In one embodiment, the thermostat includes a temperature readout display, e.g. an LCD display screen, which displays the current temperature reading from the sensor 7. The heater is left to run for a suitable amount of time to achieve a suitable water temperature inside the container, preferably bringing the water into a superheated state at 130° C. In one embodiment, a suitable heating time to reach 130° C. may be approximately seven minutes with a 1000 watt heater. The heater may be left plugged longer than a minimum prescribed heating time, for example allowed to continue operating a few minutes longer, to allow all material inside the insulation to reach 130° C. and maximum thermal energy. The heating process may be terminated by unplugging the heater. In one embodiment, the thermostat may include a timer that deactivates the heating coil upon expiry of a predetermined timer count, which exceeds the minimum heating time required to obtain a predetermined operating temperature.

With the water sufficiently heated inside the container, preferably into a superheated state, the Weed Poacher is ready to use. The elongated shape of the container and the external insulation wrapped therearound enables easy manipulation and conveyance of the device as a self-contained, handheld, wand-shaped unit. The user selects target weed, and places the tip of the device (whether defined solely by the valve core itself, or by one or more tip attachments 14, 15, 17 removably attached to the valve core) over the center of a weed (e.g. dandelion), and with the device aimed in this manner, simply presses the weed tip onto the weed for a short "burst". When the weed tip is pressed on the weed, this causes the upper end of the valve core to break its O-ring seal with the valve stem insert, and superheated tank water under pressure rushes into the lateral passage the valve core. From the lateral passage, the water proceeds down the axial passage at the center of the valve core. The small diameter along with the tank pressure will cause friction and heating of the water in the $\frac{1}{32}$-inch section of the valve core.

The travel distance of the superheated water from the container, vessel or tank to the weed is extremely short, being defined solely by the valve core. No part of the device penetrates the ground, with the final discharge point of the device being above surface, in close relation to the source of the heated water. For example, in one embodiment, with a valve core length of only 1¾-inches, the superheated tank water only has to go 1¾-inches to reach the weed. Minimizing the travel distance of the water minimizes the opportunity for the water to cool before contacting the target weed. The small passages in the valve core, and the short travel distance the valve core must move in order to open completely, also give the operator maximum control over the amount of superheated water applied, whereby the kill zone can be limited to an area smaller than a dime.

In one preferred embodiment, denim insulation is used because it is highly effective and can be handled without turning to powder. Aerogel, a far superior insulator, is too brittle and would eventually turn to dust with repeated handling. A possible production model could have aerogel sandwiched in between layers of other material, e.g. Kevlar, for maximum insulation protection. This may allow for a smaller overall diameter of the Weed Poacher, for example down to approximately 2-inches in one embodiment, making aiming much easier and reducing the overall weight of the device. It will be appreciated that these are only a few examples of various insulation solutions that may be employed to allow significant operating temperatures while maintaining safety for the operator and allowing danger-free gripping of the hand-held, self-contained, wand-shaped weed or insect termination device.

One preferred embodiment of the Weed Poacher uses water that is electrically heated to 130° Celsius and maintained a liquid under pressure within the confines of the rigid-walled vessel, container or tank. As the preferred embodiment operates well above the boiling point (100° C.), it has six hundred times the heat energy per unit volume of water than near boiling water. The higher heat energy (temperature) of the weed poacher means that more heat is transferred per unit volume of water, and so less water is needed to kill the weed, consequently providing a smaller kill zone. The preferred embodiment uses a thermal plastic valve core to reduce heat loss to a minimum, and a small (e.g. $\frac{1}{32}$-inch) opening at the tip to selectively target individual weeds. The short travel of the valve (e.g. one quarter of an inch between the open/retracted position and the closed/extended position) gives the operator maximum control over the amount of superheated water delivered to the weed. One preferred embodiment is a self-contained, portable unit and weighs about ten pounds when filled with water. The denim insulation used in one embodiment loses about one degree every two minutes, and the device carries over sixty five tablespoon-sized killing applications. Using a pre-heater and a significantly insulated container, no long electrical cords are required during the spot treatment process, and the complications of a combustible fuel heater are avoided. Although primarily described for use in killing weeds, the device may also be used for applications in which application of heated water may be useful, for example exterminating ants or other insects.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A weed or insect terminating device comprising:
a container having opposing first and second ends spaced apart on a longitudinal axis that defines a longitudinal direction of the container, a peripheral wall closing around said longitudinal axis to enclose and interior space of the container between the first and second ends thereof, a valve port opening into the interior space of the container at the first end thereof, and an openable and closeable fill opening for introduction of water into the interior space of the container;
a heating element disposed within the interior space of the container between the first and second ends thereof;
a valve core slidably disposed in the valve port at the first end of the container and displaceable back and forth in the longitudinal direction between a retracted state and an extended state in, the valve core reaching further outward from the first end of the container in the extended state than in the retracted state;
a biasing mechanism acting on the valve core in the longitudinal direction to bias the valve core into the extended position;
an axial passage in the valve core that extends through a distal end of the valve core that resides outside the container beyond the first end thereof in at least the extended position, the axial passage terminating short of a proximal end of the valve core that resides opposite the distal end thereof;
a lateral passage in the valve core that intersects the axial passage and opens radially from the valve core at a point on the valve core that resides inside the container in the retracted position;
a proximal seal spanning circumferentially around the valve core at a location between the proximal end of the valve core and the point at which the lateral passage opens radially therefrom, the proximal seal being arranged to seal against a boundary wall of the valve port in the extended position and withdraw from sealed contact with the boundary wall of the valve port in the retracted position, thereby allowing access to the lateral passage of the valve core by water in the container only in the retracted state of the valve core; and
a distal seal spanning circumferentially around the valve core in sealed contact with the boundary wall of the valve port at a location between the distal end of the valve core and the point at which the lateral passage opens radially therefrom, whereby water from the container can be dispensed through the valve port only via the lateral and axial passages of the valve core, when made accessible by retraction of the valve core.

2. The device of claim 1 wherein a final discharge opening from which water exits the device through the axial passage of the valve core is defined at a non-pointed terminus of the device.

3. The device of claim 2 wherein the non-pointed terminus of the device is flat.

4. The device of claim 2 wherein the final discharge opening is an open end of the axial passage at the distal end of the valve core, which defines the non-pointed terminus of the device.

5. The device of claim 1 wherein the boundary wall of the valve port comprises a tapered portion that grows wider toward the second end of the container, and a wider end of said tapered portion exceeds the proximal seal of the valve core in diameter.

6. The device of claim 5 wherein the valve core comprises a tapered region adjacent the proximal end thereof with an angle and direction of taper matching the tapered portion of the boundary wall of the valve port.

7. The device of claim 1 wherein the boundary wall of the valve port is defined by a threaded insert threadingly mated to the container at the first end thereof.

8. The device of claim 7 wherein the threaded insert comprises a self-lubricating plastic.

9. The device of claim 1 wherein the valve core comprises a high temperature plastic.

10. The device of claim 1 wherein the valve core comprises polyphenylsulfone.

11. The device of claim 1 wherein the container is externally covered with heat insulation material.

12. The device of claim 11 wherein the heat insulation material comprises recycled denim.

13. The device of claim 1 wherein the biasing mechanism comprises a support disposed inside the container and having radial fins attached to the peripheral wall of the container at a distance spaced from the valve port in the longitudinal direction, with openings left between said radial fins to allow passage of water past the support to the valve port, and a coil spring disposed between the support and the valve core to bias the valve core into the extended position.

14. The device of claim 13 wherein the biasing mechanism further comprises a shaft extending from the support toward the valve core, the spring being coiled around the shaft between the support and the proximal end of the valve core.

15. The device of claim 14 wherein the shaft passes through a central hub of the support from which the radial fins extend, the shaft has an end plate radiating outward from one end thereof on the same side of the support as the valve core and a stop fixed on the shaft on an opposing side of the support, and the spring is contained between the support and the end plate of the shaft in order to bias the end plate toward the valve port while the stop limits the allowable travel distance of the end plate toward the valve port.

16. The device of claim 1 comprising a tip attachment selectively attachable to and detachable from the valve core, the tip attachment increasing a footprint of the device at the distal end of the valve core to prevent ground penetration by the valve core when pressed against a ground surface or object to force the valve core into the retracted position.

17. The device of claim 16 wherein the tip attachment comprises an internally threaded collar for engagement onto the valve core via external threading at the distal end thereof, and mating threads on the valve core and the collar are arranged to bottom out in a position in which an end portion of the collar extends past the distal end of the valve core, whereby the distal end of the valve core is spaced from the ground surface when the tip attachment is placed against said ground surface.

18. The device of claim 17 wherein the collar comprises at least one radial opening extending therethrough at the end portion of the collar that extends past the distal end of the valve core.

19. The device of claim 17 wherein the tip attachment further comprises a foot plate radiating outwardly from the end portion of the collar to present a greater area of ground contact than provided by said collar.

20. The device of claim 1 wherein the heating element is arranged to heat the water into a superheated state.

\* \* \* \* \*